United States Patent
Mayhew

(10) Patent No.: US 12,110,940 B1
(45) Date of Patent: Oct. 8, 2024

(54) VIBRATION MITIGATION IN VEHICLE USING GEAR CLUTCH CONTROL

(71) Applicant: FCA US LLC, Auburn Hills, MI (US)

(72) Inventor: William R Mayhew, Ann Arbor, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/488,226

(22) Filed: Oct. 17, 2023

(51) Int. Cl.
    *F16F 15/129* (2006.01)
(52) U.S. Cl.
    CPC .................................. *F16F 15/129* (2013.01)
(58) Field of Classification Search
    CPC ............ F16F 15/129; F16D 2500/1045; F16D 2500/50293; F16D 2300/22
    See application file for complete search history.

(56) References Cited

U.S. PATENT DOCUMENTS 8,734,294 B2 * 5/2014 Hiasa ..................... B60W 10/10
477/118

\* cited by examiner

*Primary Examiner* — Huan Le
(74) *Attorney, Agent, or Firm* — Jeremy J. Klobucar

(57) ABSTRACT

A vehicle system for reducing vibrations on a vehicle includes an engine connected to an automatic transmission through a turbine of a torque converter clutch. A gearset is associated with the transmission and includes a sun gear, a ring gear and a pinion carrier. A gear clutch has a first clutch component fixed to a case of the transmission and a second clutch component fixed to the gearset. The first and second clutch components are configured to slip based on an enable condition being satisfied thereby mitigating vibrational modes experienced within the vehicle system.

18 Claims, 4 Drawing Sheets

VIBRATION MITIGATION IN VEHICLE USING GEAR CLUTCH CONTROL

FIELD

The present application relates generally to driveline vibration control in vehicles and more particularly to a system and method that alters vibrational modes in a vehicle to mitigate noise vibration and harshness (NVH).

BACKGROUND

The powertrain of a vehicle provides an output to propel the vehicle along a road. Various environmental inputs can subject the vehicle to undesirable vibrations. The vibrations can be absorbed through wheels, suspension, powertrain and other components of the vehicle during driving. Such vibrations, from the road and/or powertrain can create undesirable vibrational modes that can negatively impact fuel economy, emissions and the driving experience as a whole. Often such vibrational concerns or noise vibration and harshness (NVH) are revealed late in vehicle development cycles when all production intent components are already assembled or subsequent to final production of a powertrain. In these scenarios, mitigation of NVH can include selecting different gear ratios (usually associated with sub-optimal fuel economy and emissions), or opening a torque converter clutch completely. Accordingly, there remains a need for improvement in the relevant art.

SUMMARY

According to an example aspect of the invention, a vehicle system for reducing vibrations on a vehicle includes an engine connected to an automatic transmission through a turbine of a torque converter clutch. A gearset is associated with the transmission and includes a sun gear, a ring gear and a pinion carrier. A gear clutch has a first clutch component fixed to a case of the transmission and a second clutch component fixed to the gearset. The first and second clutch components are configured to slip based on an enable condition being satisfied thereby mitigating vibrational modes experienced within the vehicle system.

In some implementations, the second clutch component is fixed to the ring gear of the gearset. The enable condition can be further based at least partially on a torque of the turbine. The enable condition can further be based at least partially on a speed of the turbine.

In some implementations, a mass of the vehicle acts on the gearset causing a rotational inertia onto the gearset.

In other implementations, the vehicle system can further comprise a selected slip module that determines a selected slip and an actual slip module that determines an actual slip. A slip error is determined based on a comparison of the selected slip and the actual slip.

According to some implementations, a clutch pressure of the gear clutch is based on the slip error.

According to other implementations, the clutch pressure of the gear clutch can further be based on a torque of the turbine.

According to other implementations, a method of reducing vibrations on a vehicle is provided. The method includes providing an engine connected to an automatic transmission through a turbine of a torque converter clutch; a gearset associated with the transmission and having a sun gear, a ring gear and a pinion carrier; and a gear clutch having a first clutch component fixed to a case of the transmission and a second clutch component fixed to the gearset.

Relative movement is initiated between the first clutch component and the second clutch component based on a revolutions per minute of the turbine, wherein the relative movement between the first clutch component and the second clutch component mitigates vibrational modes experienced on the vehicle.

According to other implementations, the method includes determining whether enable conditions are met, the enable conditions comprising a torque of the turbine.

According to other implementations, a selected slip is determined at a selected slip module. An actual slip is determined at an actual slip module. A slip error is determined based on a comparison between the selected slip and the actual slip.

In other implementations, the method determines a clutch pressure of the gear clutch based on the slip error. The clutch pressure of the gear clutch is further based on a torque of the turbine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As explained above, various environmental inputs can subject the vehicle to undesirable vibrations. The vibration inputs, such as from a road during driving and/or from vehicle components (powertrain etc.), can be absorbed through wheels, suspension, powertrain and other components of the vehicle during driving. Such vibrations can create undesirable vibrational modes that can negatively impact fuel economy, emissions and the driving experience as a whole. As will become appreciated from the following discussion, existing components of the vehicle powertrain, such as various clutches can be leveraged (e.g., controlled) to mitigate the vibrations experienced in the vehicle to improve fuel economy, wear, and drivability as a whole. In other words, one or more clutches can be opened (e.g., slip) to allow relative movement between adjacent structures to alter a vibrational mode and reduce vibrations experienced by the driver.

Figure 1:
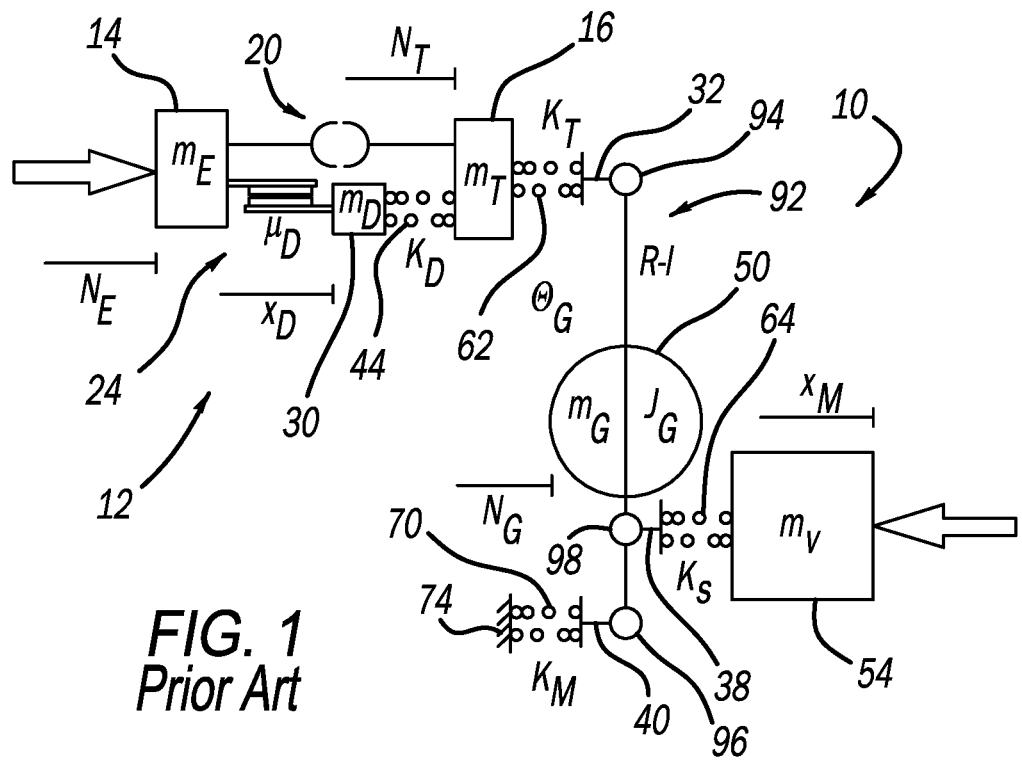
FIG. 1 is a schematic diagram of an exemplary vehicle system using only a converter clutch as an active damping source according to one Prior Art example.

With initial reference now to FIG. 1, a schematic diagram of an exemplary vehicle system using only a converter clutch as an active damping source according to one Prior Art example is shown and generally identified at reference 10. The vehicle system 10 is represented on vehicle 12 as a spring-mass-damper system and includes an engine or engine inertia ($M_E$) 14 connected to an automatic transmission 16 through a torque converter 20 and torque converter clutch 24, with gears reacting torque to the vehicle 12. Sources of torsional compliance include a converter damper ($K_D$) 30, a turbine shaft ($K_T$) 32, output shaft(s) ($K_S$) 38 and powertrain mounts ($K_M$), or transmission case 40.

A biasing member (or set of springs) 44 acts between the automatic transmission 16 and the converter damper ($K_D$) 30. A biasing member (or set of springs) 62 acts between the automatic transmission 16 and the turbine shaft ($K_T$) 32. A biasing member (or set of springs) 64 acts between the output shaft(s) ($K_S$) 38 and a mass of the vehicle 54. A mass and rotational inertia (of the transmission) 50 connects through biasing member 64 to a mass of the vehicle 54. A biasing member (or set of springs) 70 acts between the powertrain mounts ($K_M$) 40 and a vehicle chassis 74. The rotational inertia 50 is associated with a gearset (shown as a lever) 92 generally having a sun gear 94, a ring gear 96 and a pinion carrier 98.

Figure 2:
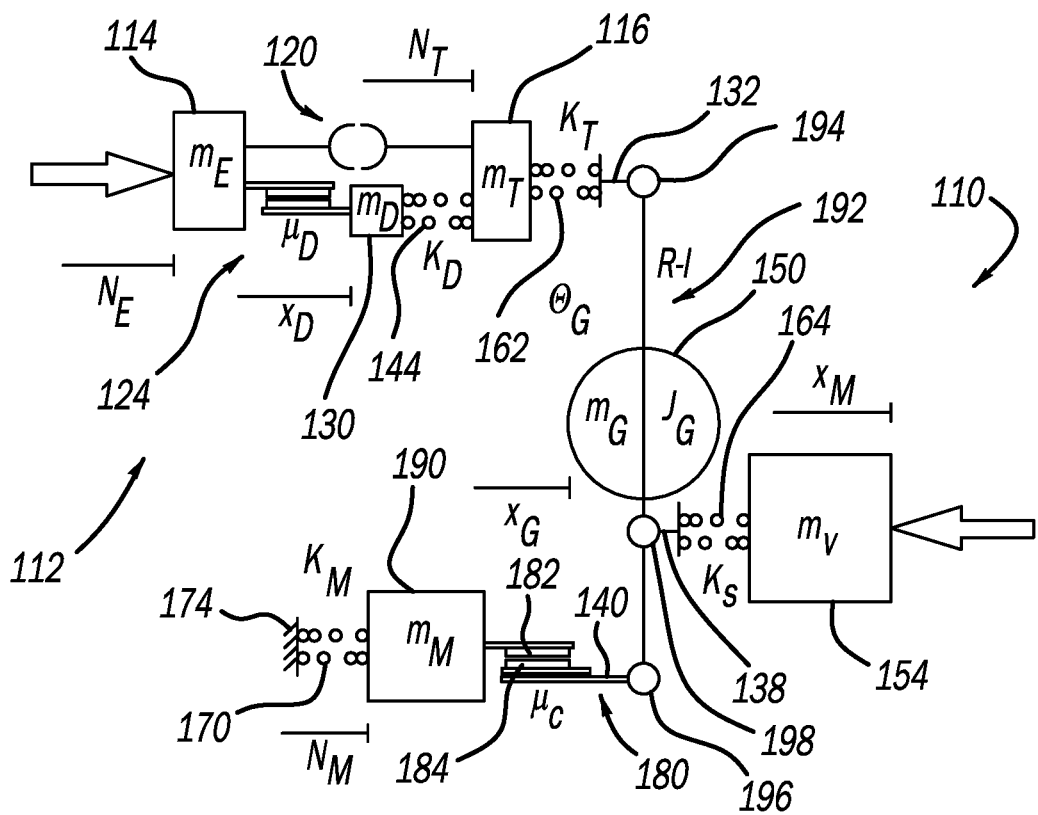
FIG. 2 is a schematic diagram of a vehicle system where powertrain inertia including the motor block and transmission case that are decoupled from the gearbox by controlled slip in a gear clutch in accordance with the principles of the present disclosure.

A vehicle system 110 constructed in accordance to one example of the present disclosure will now be described with reference to FIG. 2. Unless otherwise described, like components of the system 10 described above in FIG. 1 are identified in FIG. 2 using reference numerals having a 100 suffix.

The vehicle system 110 is represented on vehicle 112 as a spring-mass-damper system and includes an engine or engine inertia ($M_E$) 114 connected to an automatic transmission 116 through a torque converter 120 and torque converter clutch 124, with gears reacting torque to the vehicle 112. Sources of torsional compliance include a converter damper ($K_D$) 130, a turbine shaft ($K_T$) 132, output shaft(s) ($K_S$) 138 and powertrain mounts ($K_M$), or case of the transmission 140.

A biasing member (or set of springs) 144 acts between the automatic transmission 116 and the converter damper ($K_D$) 130. A biasing member (or set of springs) 162 acts between the automatic transmission 116 and the turbine shaft ($K_T$) 132. A biasing member (or set of springs) 164 acts between the output shaft(s) ($K_S$) 138 and a mass of the vehicle 154. A mass and rotational inertia 150 connects through biasing member 164 to a mass of the vehicle 154. The rotational inertia 150 is associated with a gearset (shown as a lever) 192 generally having a sun gear 194, a ring gear 196 and a pinion carrier 198.

As will be described in detail, the vehicle system 110 according to the present disclosure incorporates a gear clutch 180 (such as associated with a gear of the transmission 116) that can be slipped when reacting to the biasing member 170. By slipping (allowing relative movement of clutch components) the clutch 180 can be used (controlled) to reduce vibrations within the vehicle system 110. Explained further, while the connection in the prior art system of FIG. 1 between the powertrain mounts ($K_M$) 40 and biasing member 70 is essentially rigid, the connection between the powertrain mounts ($K_M$) 140 and the biasing member 170 according to the present disclosure and shown in FIG. 2 is interrupted by the clutch 180 having clutch components 182 and 184 that selectively move (slip) relative to each other to mitigate vibration of the vehicle system 110.

In the example shown, the clutch member 182 is fixed to the case of the transmission (represented by $M_M$ 190) while the clutch member 184 is fixed to some component (in the example shown the ring gear 196) in the gearbox. The clutch members 182 and 184 are permitted to slip (or operate in a neutral idle condition). It will be appreciated that while this description is directed generically to "clutch 180", the clutch 180 can be any clutch that has a first clutch member 182 fixed to the case of the transmission 116 and a second clutch member 184 fixed to any gear of the transmission 116.

In this regard, an input from a medium mass $M_M$ 190 can be dampened (and by a controlled amount) by purposefully allowing relative movement (controlled slip) of the clutch components 182 and 184 of the clutch 180. In sum, by slipping the clutch 180, the vibrational modes (caused by inputs generated by road and/or powertrain components of the vehicle 112) can be controlled of the resulting system. A frictional interface of the clutch 180 is represented by $\mu_c$.

During use of the system 110, slip of the clutch 180 can be initiated based on anticipating low engine revolution per minute (RPM) in an identified gear (also referred to as a "coast down" event). In other words, slip of the clutch 180 would be initiated, such as by a controller that runs the methods shown in FIGS. 3-6, immediately (for drivability reasons). As soon as a throttle input is detected, the clutch 180 can be locked (no slip) in order to best launch the vehicle.

With continued reference to FIG. 2 and additional reference to FIG. 3, an exemplary "enable" logic control flowchart 210 illustrating conditions necessary to activate or deactivate the control method 210 implemented by the vehicle system 110 will be described. The control method 210 generally includes a series of input conditions that can be satisfied, or partially satisfied to enable operation of the system 110. The input conditions can include a gear input 212, a turbine (speed) rpm 222, an output (speed) rpm 232, a turbine (torque) Nm 242 and an output (torque) Nm 252. The gear input 212 can be compared to a min-max gear threshold 214. The turbine rpm 222 can be compared to a min-max rpm threshold 224. The output rpm 232 can be compared to a min-max rpm threshold 234. The turbine (torque) Nm 242 can be compared to a min-max (torque) Nm threshold 244. The output (torque) Nm 252 can be compared to a min-max (torque) Nm threshold 254. An enable module 260 correlates the outputs of each of the min-max gear threshold 214, the min-max rpm threshold 224, the min-max rpm threshold 234, the min-max (torque) Nm threshold 244 and the min-max (torque) Nm threshold 254 and determines whether enable conditions are met to operate (e.g., actively slip the clutch 180 to reduce vibration) the vehicle system 110.

Figure 4:
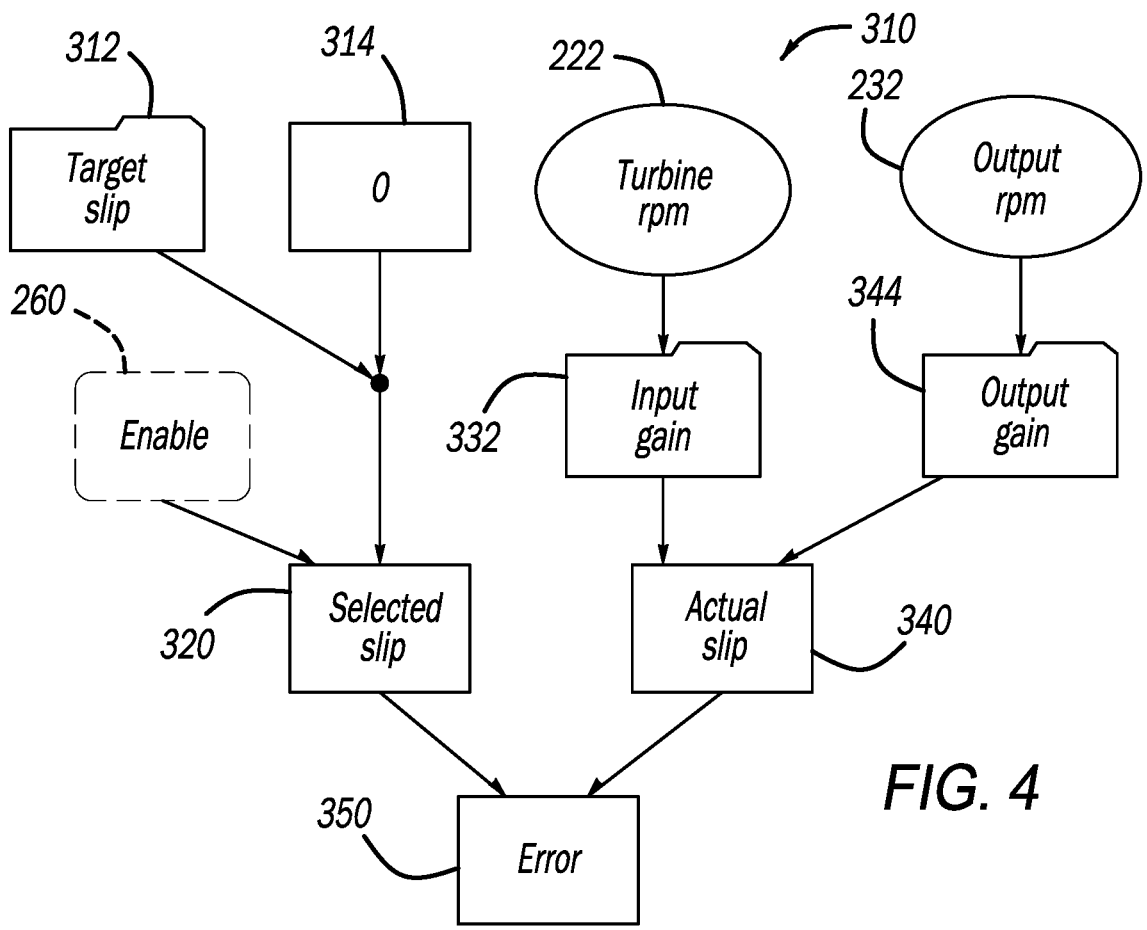
FIG. 4 is an exemplary "slip error" logic flowchart illustrating calculations for a target clutch slip used to reduce vibration including actual slip and a comparison in accordance with the principles of the present disclosure.

With additional reference to FIG. 4, an exemplary "slip error" logic control flowchart 310 illustrating calculations for a target clutch slip used to reduce vibration will be described. The targeted clutch slip is compared to an actual clutch slip to determine a slip error 350. A target slip 312 and a zero slip 314 are received by a selected slip module 320 based on an enable conditions satisfied at the enable module 260. Inputs include the turbine rpm 220 and an output rpm 232. The turbine rpm 220 is received by an input gain module 332. The output rpm 232 is received by an output gain 344. An actual slip 340 is calculated based on an input gain output from the input gain module 332 and an output gain output from the output gain module 344. The selected slip 320 and the actual slip 340 are output into an error module 350 that determines the slip error 350 or differential between the selected slip 320 and the actual slip 340.

With additional reference to FIG. 5, an exemplary "control" logic flowchart 410 illustrating use of the target slip 312 of FIG. 4 will be described. The target slip 312 is used along with the turbine (torque) Nm 242 and the output (torque) Nm 252 to produce a commanded hydraulic clutch pressure 450 to the clutch 180 in accordance with the principles of the present disclosure. As used herein a commanded hydraulic clutch pressure 450 is used to denote a hydraulic pressure delivered to the gear clutch 180. As can be appreciated, hydraulic pressure measured within the gear clutch 180 is proportional to relative movement of the first and second clutch members 180, 182. In this regard, regulating pressure in the gear clutch 180 can alter a damping function of the gear clutch 180.

The turbine (torque) Nm 242 is input into the input torque gains 432. The output (torque) Nm 250 is input into the output gains 440. Feedback gains 422 are used to generate a closed loop (torque) Nm 424. The input gains 432 and the output gains 440 are used to generate a clutch (torque) Nm 436. A clutch torque 430 is determined based on the closed loop (torque) Nm 424 and the clutch (torque) Nm 436. The clutch pressure 450 is determined based on a Nm:Prs gain 444 and a Prs offset 448.

Figure 3:
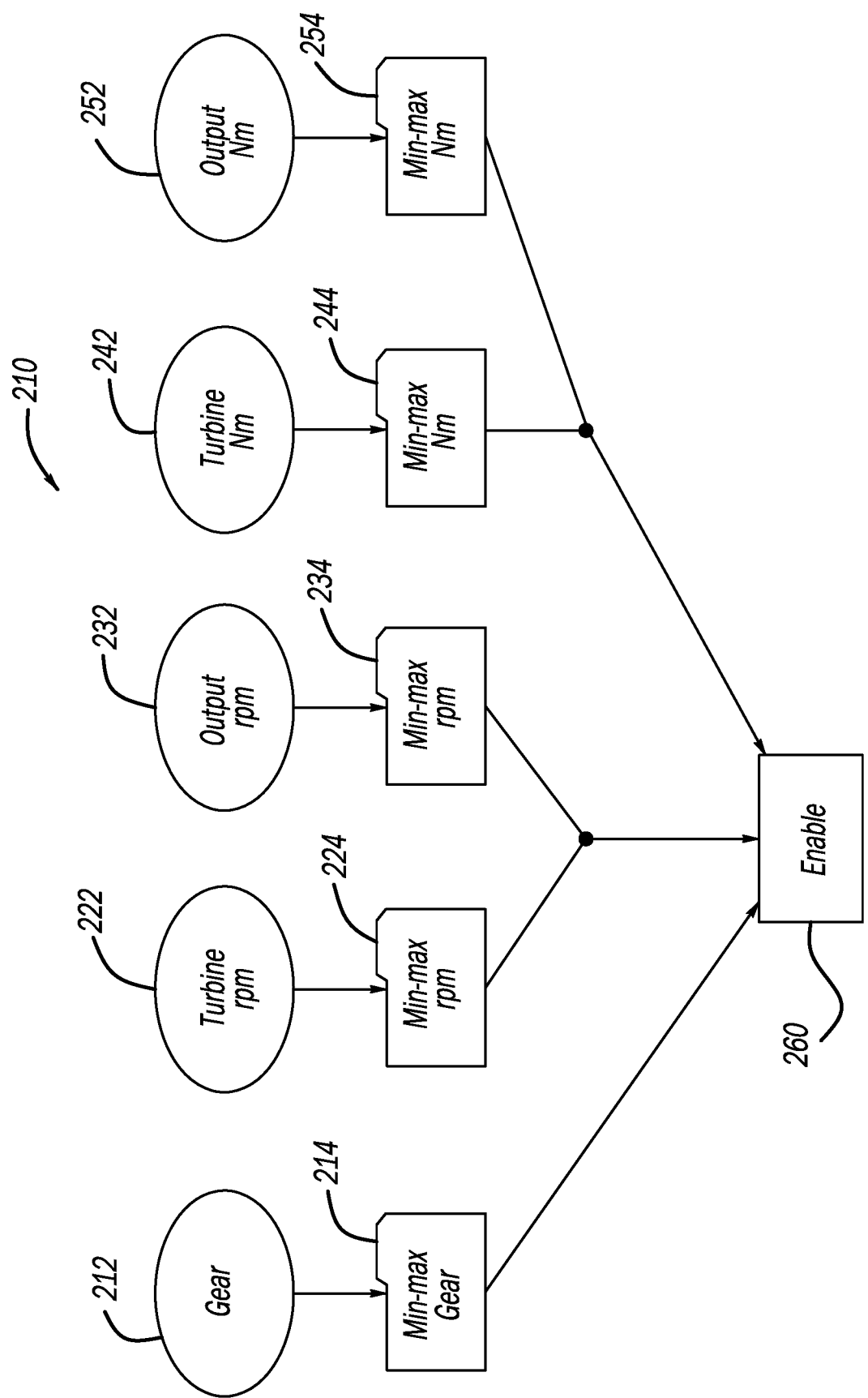
FIG. 3 is an exemplary "enable" logic flowchart illustrating conditions necessary to activate or deactivate the control method implemented by the vehicle system of FIG. 2 in accordance with the principles of the present disclosure.
Figure 6:
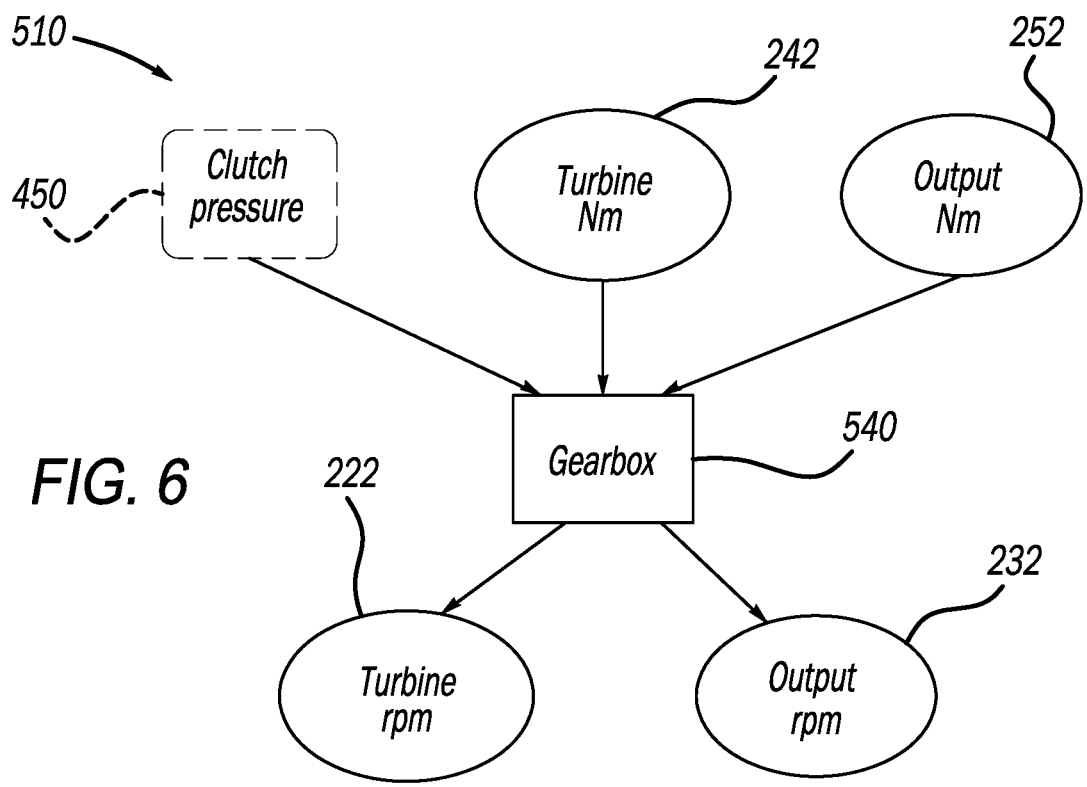
FIG. 6 is an exemplary "plant" logic flowchart illustrating torques, including torque generated by clutch pressure that are used in the "control" logic flowchart of FIG. 5 and the "enable" logic flowchart of FIG. 3.
Figure 5:
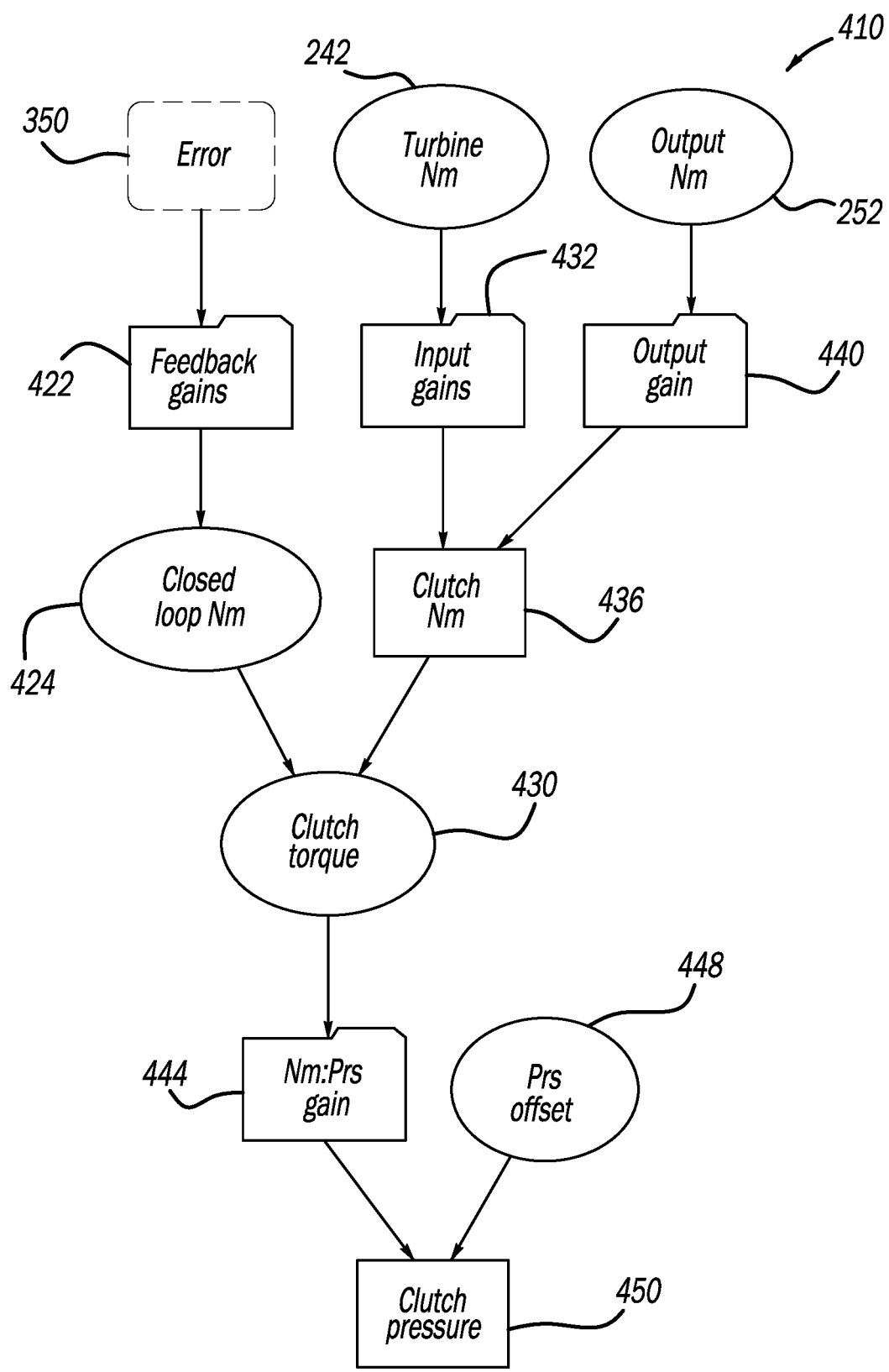
FIG. 5 is an exemplary "control" logic flowchart illustrating use of the target slip of FIG. 4 along with input and output torque to produce a commanded hydraulic pressure to the clutch in accordance with the principles of the present disclosure.

With additional reference now to FIG. 6, an exemplary "plant" logic flowchart 510 is shown illustrating torques, including torque generated by clutch pressure 450 of the clutch 180 that are used in the "control" logic flowchart of FIG. 5 and the "enable" logic flowchart of FIG. 3. The turbine (torque) Nm 242 and the output (torque) Nm 252, along with the clutch pressure 450 are fed into a gearbox module 540 that outputs the turbine rpm 220 and an output rpm 232. In this regard, the system 110 is closed loop.

It will be appreciated that the term "controller" as used herein refers to any suitable control device(s) that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture. It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle system for reducing vibrations on a vehicle, the vehicle system comprising:
   an engine connected to an automatic transmission through a turbine and a torque converter clutch;
   a gearset associated with the transmission and having a sun gear, a ring gear and a pinion carrier; and
   a gear clutch having a first clutch component fixed to a case of the transmission and a second clutch component fixed to the ring gear of the gearset, wherein the first and second clutch components are configured to slip based on an enable condition being satisfied thereby mitigating vibrational modes experienced within the vehicle system.

2. The vehicle system of claim 1, wherein the enable condition is based at least partially on a torque of the turbine.

3. The vehicle system of claim 2, wherein the enable condition is further based at least partially on a speed of the turbine.

4. The vehicle system of claim 2, further comprising a selected slip module that determines a selected slip and an actual slip module that determines an actual slip, wherein a slip error is determined based on a comparison of the selected slip and the actual slip.

5. The vehicle system of claim 4, wherein a clutch pressure of the gear clutch is based on the slip error.

6. The vehicle system of claim 5, wherein the clutch pressure of the gear clutch is based on a torque of the turbine.

7. The vehicle system of claim 1, wherein a mass of the vehicle acts on the gearset causing a rotational inertia onto the gearset.

8. A method of reducing vibrations on a vehicle, the method comprising:
   providing an engine connected to an automatic transmission through a turbine and a torque converter clutch; a gearset associated with the transmission and having a sun gear, a ring gear and a pinion carrier; and a gear clutch having a first clutch component fixed to a case of the transmission and a second clutch component fixed to the gearset; and
   initiating relative movement between the first clutch component and the second clutch component based on a revolutions per minute of the turbine, wherein the relative movement between the first clutch component and the second clutch component mitigates vibrational modes experienced on the vehicle.

9. The method of claim 8, further comprising:
   determining whether enable conditions are met, the enable conditions comprising a torque of the turbine.

10. The method of claim 9, further comprising:
    determining, at a selected slip module, a selected slip;
    determining, at an actual slip module, an actual slip; and
    determining a slip error based on a comparison between the selected slip and the actual slip.

11. The method of claim 10, further comprising:
    determining a clutch pressure of the gear clutch based on the slip error.

12. The method of claim 11, wherein determining the clutch pressure of the gear clutch is further based on a torque of the turbine.

13. A vehicle system for reducing vibrations on a vehicle, the vehicle system comprising:
    an engine connected to an automatic transmission through a turbine and a torque converter clutch;
    a gearset associated with the transmission and having a sun gear, a ring gear and a pinion carrier, wherein a mass of the vehicle acts on the gearset causing a rotational inertia onto the gearset; and a gear clutch having a first clutch component fixed to a case of the transmission and a second clutch component fixed to the gearset, wherein the first and second clutch components are configured to slip based on an enable condition being satisfied thereby mitigating vibrational modes experienced within the vehicle system.

14. The vehicle system of claim 13, wherein the enable condition is based at least partially on a torque of the turbine.

15. The vehicle system of claim 14, wherein the enable condition is further based at least partially on a speed of the turbine.

16. The vehicle system of claim 14, further comprising a selected slip module that determines a selected slip and an actual slip module that determines an actual slip, wherein a slip error is determined based on a comparison of the selected slip and the actual slip.

17. The vehicle system of claim 16, wherein a clutch pressure of the gear clutch is based on the slip error.

18. The vehicle system of claim 17, wherein the clutch pressure of the gear clutch is based on a torque of the turbine.

* * * * *